W. H. PAVITT, Jr.
SETTLING TANK.
APPLICATION FILED MAY 16, 1919.
1,430,181.
Patented Sept. 26, 1922.
2 SHEETS—SHEET 1.
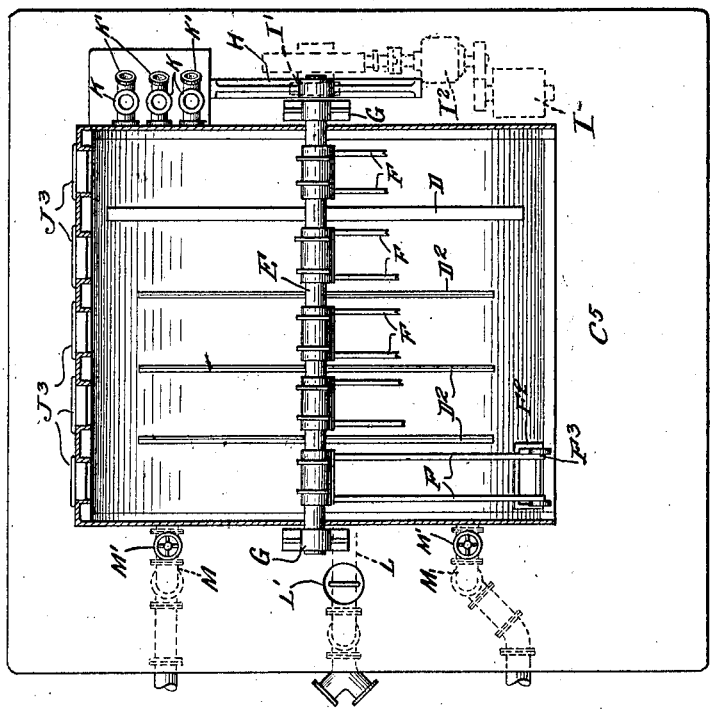
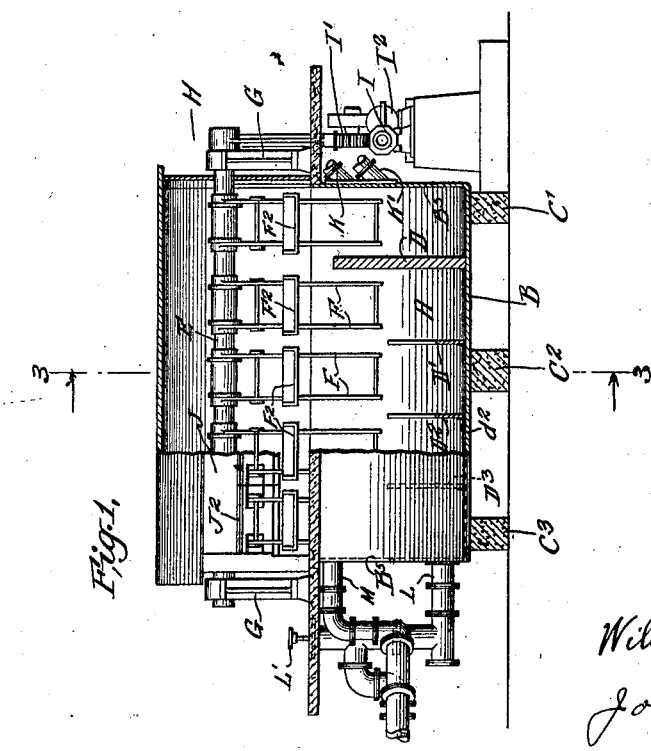
INVENTOR
William H. Pavitt Jr.
BY
John E. Hubbell
ATTORNEY

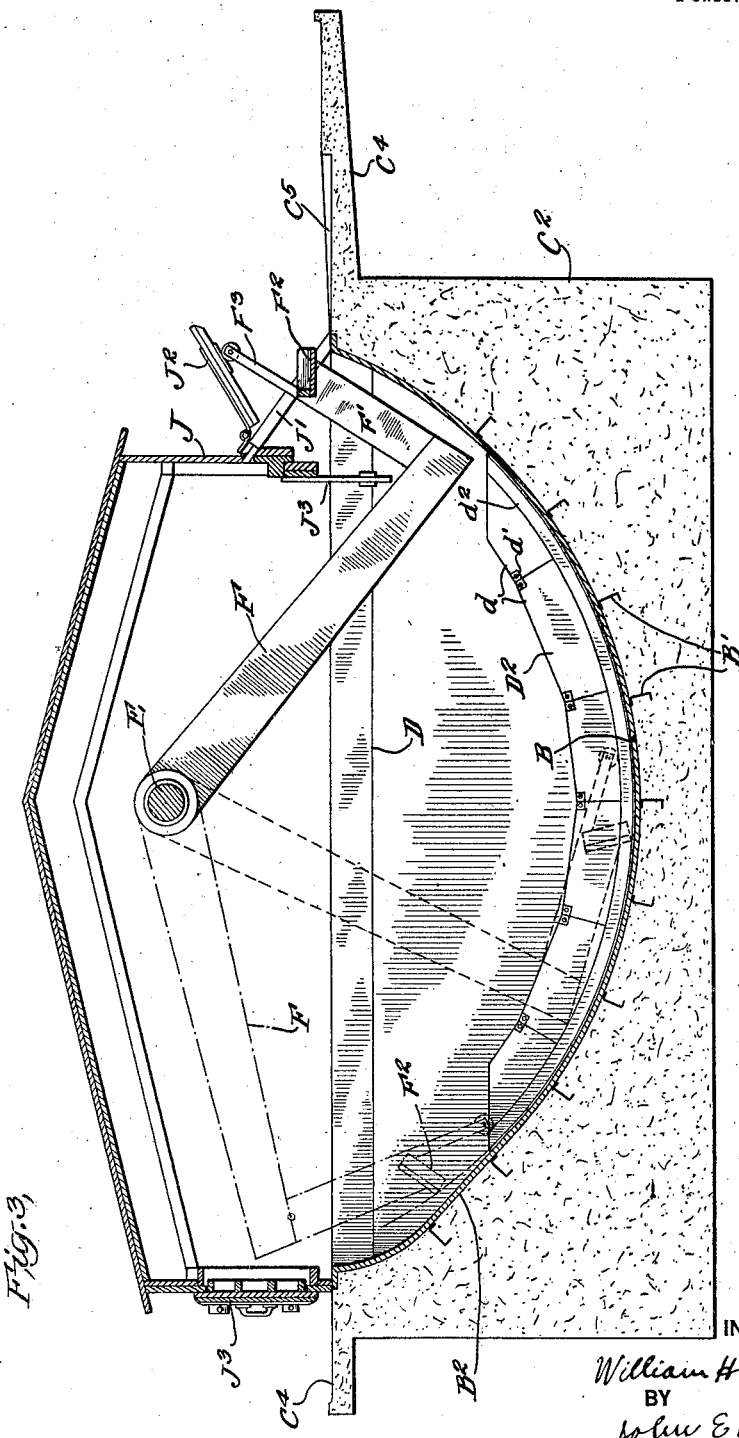

Patented Sept. 26, 1922.

1,430,181

UNITED STATES PATENT OFFICE.

WILLIAM HESSER PAVITT, JR., OF BROOKLYN, NEW YORK, ASSIGNOR OF ONE-THIRD TO LOUIS WILPUTTE AND TWO-THIRDS TO ALICE A. WILPUTTE, BOTH OF NEW ROCHELLE, NEW YORK.

SETTLING TANK.

Application filed May 16, 1919. Serial No. 297,511.

*To all whom it may concern:*

Be it known that I, WILLIAM H. PAVITT, Jr., citizen of the United States, and resident of borough of Brooklyn, in the county of Kings and State of New York, have invented certain new and useful Improvements in Settling Tanks, of which the following is a specification.

My present invention consists in an improved means for separating out of a liquid foreign matter carried thereby, and was primarily devised for use in a by-product coke oven plant for eliminating pitch and foreign matter from tar and ammonia liquor, but is not restricted to such use.

In carrying out my invention I provided a settling or decanting chamber of novel construction with novel provisions for moving a cleaning member periodically along the bottom of the tank to sweep out pitch or other foreign matter settling out of the liquid passing through the tank.

The various features of novelty which characterize my invention are pointed out with particularity in the claims annexed to and forming a part of this specification. For a better understanding of my invention, however, and the advantages possessed by it, reference should be had to the accompanying drawings and descriptive matter in which I have illustrated and described a preferred embodiment of my invention.

Of the drawings:

Figure 1 is an elevation partly in section.

Figure 2 is a plan view with the housing above the settling tank proper in section, and Figure 3 is a section on the line 3—3 in Figure 1.

In the drawings A represents the tank chamber, the curved bottom B of which, in the preferred construction illustrated, is formed by steel plate. The curved bottom B of the tank is stiffened by external ribs $B^1$ in the form of channel bars, and the tank is supported as shown on three concrete piers $C^1$, $C^2$ and $C^3$ in the curved upper edges of which the corresponding portions of the ribs $B^1$ are embedded. These piers also support a platform $C^4$ at the margin of the upper edge of the curved tank bottom $B^1$. The ends $B^5$ of the tank proper may also be formed of metal plates.

Within the tank, spaced apart, baffles D, $D^1$, $D^2$ and $D^3$ are provided. These are secured to the curved tank bottom and lie in vertical planes extending transversely to the axis of curvature of the tank bottom. As shown, the baffle D has its upper edge horizontal and located but a short distance below the level of the platform $C^4$. The baffles $D^1$, $D^2$ and $D^3$ which are all like, are shown as curved ribs on the inner wall of the tank, and as formed of sections $d$ of metal plate connected to the tank bottom through angles bars $d^2$, and connected together at their adjacent edges by gussets $d^1$. The baffles D, $D^1$, $D^2$ and $D^3$ as shown divide the lower portion of the tank into compartments of equal width extending in a series from one end of the tank to the other.

The tank cleaning means comprises a horizontally disposed shaft E, journalled at its ends in pedestals G. The shaft E carries a series of arms F, one for each of the separate compartments into which the bottom portions of the tank is divided by the partitions D, $D^1$, $D^2$ and $D^3$. Each arm F terminates in a lateral extension $F^1$, carrying a cleaning or scraper blade $F^2$ and a door opening extension $F^3$.

The tank is covered by a housing J, formed at one side of the tank with lateral openings $J^1$, each normally closed by a door $J^2$ and located one at the corresponding end of each of the compartments formed by the baffles or partitions D, $D^1$, $D^2$ and $D^5$. A partition element $J^3$ depends from the wall of the housing in front of the outlets $J^1$ down into the tank to a level below the normal liquid level therein, but terminates sufficiently above the adjacent portion of the tank bottom to permit the arm extensions $F^1$ to pass under the partition into their discharging position shown in full lines in Fig. 3. In this position the doors $J^2$ are held open by the door opening extensions $F^3$, and the scraper blades $F^2$ are above the level of the platform $C^4$, so that pitch and other foreign matter swept out of the tank on the scraper blades $F^2$ may then be moved by a hoe or shovel off the scraper blades and on to the adjacent portion $C^5$ of the platform $C^4$. Advantageously as shown, the blades $F^2$ are not exactly radial to the shaft E but are inclined backward so that they will be approximately horizontal when in the position shown in full lines in Fig. 3. Preferably as shown, the doors J² when in their closed positions are inclined to the horizontal as shown, so that the doors will close singly under the action of gravity when the arms J³ are retracted.

The tank bottom B is for its major portion curved cylindrically about the axis of the shaft E, so that it conforms to the paths of the various scraper blades F², but at the side of the tank opposite to that at which the openings J¹ are formed, the tank bottom is inclined away from the path of the scraper blades F² as indicated at B², so that substantial clearance X exists between tank wall and the scraper blades when the latter are in the left-hand dotted line position shown in Fig. 3. In consequence as the scraper blades move from the full line position in Fig. 3 to the left-hand dotted line position shown in that figure, the material swept along back of the blades during the major portion of this movement is permitted to slide off the blades when the latter reach their left-hand dotted line position, and the material thus sliding off the backs of the blades falls into position to be picked up by the front sides of the scraper blades on the return or active stroke of the cleaning device during which the blades move from the left-hand dotted line position to the full line position shown in Fig. 3.

Advantageously, as shown, a series of inspection openings normally sealed by doors J³ are provided in the tank housing above the left-hand platform C⁴ as seen in Fig. 3. The shaft E is oscillated back and forth as required by means which, as shown, comprises a gear segment H secured to one end of the shaft E and in mesh with a spur gear I' connected to the shaft of a reversible electric motor I by speed reducing gearing I² of conventional type.

K and K¹ represent tar inlets at the right-hand end of the tank as seen in Figs. 1 and 2, and L represents a bottom outlet, and M two upper outlets from the tank provided at the left-hand end of the latter. The outlet L is provided with a valve L¹, and the outlets M are each provided with a valve M¹.

In the intended operation of the apparatus shown, the liquid to be passed through the tank enters the latter through the inlets K and K¹ and flows slowly through the tank to the outlets L and M at the opposite end of the tank. The baffle D extends upward high enough to insure a liquid seal at all times for the inlets K and K¹. As liquid flows slowly through the tank from the inlets K and K¹ to the outlets L and M, non-liquid material of sufficient specific gravity settles to the bottom of the tank, and the matter thus accumulated on the tank bottom is periodically removed by the scraper blades F². The shaft E should be rotated slowly enough to prevent agitation of the liquid in the tank tending to interfere with the decantation or settling out process thus in practice.

The scraper blades may be moved so that it will take ten minutes or so for them to pass between the full line position and the left-hand dotted line position shown in Figure 3. In the specific use of the apparatus in connection with by-product coke oven plants referred to above, the liquid passing into the tank is partly tar and partly ammonia liquor. The specific gravity of the tar is appreciably greater than that of the ammonia liquor, consequently the first tank compartment, namely, that between the partition or baffle D and the adjacent end wall of the tank will soon become practically filled with tar. This introduces no difficulty, however, since the valved upper and lower outlets from the opposite end of the tank make it possible by a suitable adjustment of the valves to remove tar from the bottom of the tank and ammonia liquor from the top of the tank, as required, to insure the desired ratio of tar and ammonia liquid discharged in normal operation and to prevent the tank from filling up with either tar or ammonia liquor to the practical exclusion of the other. When the tank is used for tar and ammonia the housing J covering the tank proper should be made vapor-tight and of material adapted to resist the action of the ammonia fumes rising from the surface of the liquid in the tank. The provision of the partitions J in front of the outlets J¹ greatly reduces the escape of ammonia vapor when the doors J² are opened, since the space on the outlet side of the partition J in which ammonia vapors may collect is comparatively small and the surface of the liquid from which ammonia vapors may rise and escape through the outlets J¹ when open space is comparatively small.

While in accordance with the provisions of the statutes I have illustrated and described the best form of my invention now known to me, it will be apparent to those skilled in the art that changes may be made in the form of the apparatus disclosed without departing from the spirit of my invention as set forth in the appended claims, and that under some conditions, certain features of my invention may be used with advantage without a corresponding use of other features.

Having now described my invention, what I claim as new and desire to secure by Letters Patent, is:

1. The combination with a settling tank of a cleaning member pivoted to swing back and forth through said tank about a horizontally disposed axis, the bottom of said tank being curved to closely conform to the path of the cleaning member, except adjacent one end of said path, where it diverges from said path.

2. The combination with an enclosed settling tank having a curved bottom and a lateral outlet of a partition within the tank in front of said outlet adapted to unite with the liquid in the tank to form a vapor seal between said outlet and the main interior of the tank, and a cleaning device movable along the curved bottom of the latter and under said partition to sweep matter settling on the tank bottom to said outlet.

3. The combination with an enclosed settling tank having a curved bottom and a lateral outlet of a suspended partition within the tank in front of said outlet adapted to unite with the liquid in the tank and form a vapor seal between said outlet and the main interior of the tank, and a cleaning device comprising a shaft substantially coaxial with the curved tank bottom, and an arm carried by the shaft carrying a scraper blade and bent to permit the blade to pass beneath partition.

4. The combination with a settling tank comprising a curved steel bottom and steel ends, concrete piers having curved seats in which the tank rests and reinforcing metal bars secured to the outer side of the tank bottom and embedded in the piers, of a cleaning member pivoted to swing back and forth through said tank about a horizontal axis transverse to said piers.

5. The combination with a settling tank formed of metal plate and having a curved bottom and an inlet at one end and an outlet at the opposite end, and baffles formed of plate sections secured to the curved tank bottom and extending transversely to the axis of curvature and spaced at intervals along the length of the tank, of cleaning members pivoted to swing back and forth between said baffles about a horizontal axis transverse to said baffles.

Signed at New York city, in the county of New York and State of New York, this 14th day of May, A. D. 1919.

WILLIAM HESSER PAVITT, Jr.